United States Patent
Gu et al.

(10) Patent No.: US 10,028,218 B2
(45) Date of Patent: Jul. 17, 2018

(54) METHOD AND DEVICE FOR CONTROLLING CONCURRENT DATA TRANSMISSION, AND TERMINAL

(71) Applicant: ZTE Corporation, Shenzhen (CN)

(72) Inventors: Youpeng Gu, Shenzhen (CN); Lifeng Xu, Shenzhen (CN); Sheng Zhong, Shenzhen (CN); Wei Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 30 days.

(21) Appl. No.: 15/039,039

(22) PCT Filed: Jun. 18, 2014

(86) PCT No.: PCT/CN2014/080258
§ 371 (c)(1),
(2) Date: May 25, 2016

(87) PCT Pub. No.: WO2015/078171
PCT Pub. Date: Jun. 4, 2015

(65) Prior Publication Data
US 2017/0223629 A1    Aug. 3, 2017

(30) Foreign Application Priority Data
Nov. 26, 2013    (CN) .......................... 2013 1 0611516

(51) Int. Cl.
*H04W 52/02*    (2009.01)
(52) U.S. Cl.
CPC ... *H04W 52/0216* (2013.01); *H04W 52/0209* (2013.01)
(58) Field of Classification Search
CPC ................................................ H04W 52/0216
See application file for complete search history.

(56) References Cited

U.S. PATENT DOCUMENTS

| | | | |
|---|---|---|---|
| 2005/0003794 A1* | 1/2005 | Liu | H04W 52/0216 455/355 |
| 2007/0238437 A1* | 10/2007 | Jaakkola | H04W 52/0251 455/343.1 |

(Continued)

FOREIGN PATENT DOCUMENTS

| | | |
|---|---|---|
| CN | 1929361 A | 3/2007 |
| CN | 101667849 A | 3/2010 |

(Continued)

OTHER PUBLICATIONS

International Search Report for corresponding application PCT/CN2014/080258 filed on Jun. 18, 2014; dated Sep. 25, 2014.

(Continued)

*Primary Examiner* — Jason E Mattis
(74) *Attorney, Agent, or Firm* — Cantor Colburn LLP (57) ABSTRACT

Provided are a method and device for controlling concurrent data transmission, and a terminal. The present disclosure relates to the field of mobile devices. The method for controlling concurrent data transmission is applied to a terminal and includes that: a data transmission request sent by a terminal system is received; when it is judged that the received data transmission request is an important data transmission request, the data transmission is permitted; and when it is judged that the received data transmission request is an unimportant data transmission request, whether this unimportant data transmission request is permitted is judged, and when the unimportant data transmission request is permitted, this unimportant data transmission is conducted; otherwise, the unimportant data transmission is prohibited. The solution solves the problems of many data transmission times and high power consumption in the terminal system, and reduces the power consumption gen- (Continued)

erated by data transmission in the terminal system by limiting the transmission times of unimportant data.

6 Claims, 2 Drawing Sheets

(56) References Cited

U.S. PATENT DOCUMENTS

| | | | |
|---|---|---|---|
| 2010/0070786 A1* | 3/2010 | Qing | H04W 24/00 713/321 |
| 2013/0024706 A1* | 1/2013 | Katar | H04L 12/12 713/321 |
| 2014/0201556 A1* | 7/2014 | Attar | H04W 52/0245 713/340 |
| 2015/0024806 A1 | 1/2015 | Nobusawa et al. | |
| 2015/0055641 A1* | 2/2015 | Pantelidou | H04W 52/0216 370/338 |

FOREIGN PATENT DOCUMENTS

| | | |
|---|---|---|
| CN | 102077673 A | 5/2011 |
| EP | 1349320 A2 | 10/2003 |
| WO | 2013141285 A1 | 9/2013 |

OTHER PUBLICATIONS

Supplementary European Search Report Application No. EP14866506; dated Oct. 19, 2016; pp. 8.

* cited by examiner

METHOD AND DEVICE FOR CONTROLLING CONCURRENT DATA TRANSMISSION, AND TERMINAL

TECHNICAL FIELD

The present disclosure relates to the field of mobile devices, particularly to a method and device for controlling concurrent data transmission and a terminal.

BACKGROUND

The problem of power consumption is an important factor that limits the development of mobile devices. With the development of the mobile Internet, more and more mobile devices are connected to the Internet through mobile networks, and power consumption generated by data transmission of the mobile networks is a large part in power consumption of the mobile devices. Therefore, reduction of power consumption generated by data transmission is of great significance to a solution for the problem of power consumption of the mobile devices.

States of a mobile network are divided into an idle channel, a Forward Access Channel (FACH) and a Dedicated Physical Data Channel (DCH) according to levels of power consumption. The mobile network is in an idle state in normal times when there is no data transmission, and there is little power consumption in the state. The change of network states during a single data transmission is described as follows: firstly, the network changes from the idle state to a DCH state in 2 seconds, and transmits user data at full speed in the DCH state (the DCH state is a high speed data transmission state and is also a state with the highest power consumption); the mobile network is maintained in the DCH state for 5 seconds after the data transmission is completed, and if there is no data that can be transmitted within these 5 seconds, immediately changes from the DCH state to an FACH state (the FACH state is a low speed data transmission state in which a transmission rate is relatively low and power consumption is also lower than that in the DCH state), remains in the FACH state for 12 seconds, and if there is still no data that can be transmitted during this period of time, immediately changes from the FACH state to the IDLE state. Thus, additional cost of power consumption of 2+5+12=19 seconds will be caused in a typical data transmission process. Wireless power consumption is wasted within this period of time without any data transmission. Besides, the states are maintained for different time values by different wireless network technologies and operators, but the additional cost on power consumption is generally inevitable. It can be found through analysis that for a given amount of data that needs to be transmitted, the power consumption generated by transmitting the data in multiple transmissions is higher than that generated by transmitting the data in one transmission, and the more the number of the transmissions, the higher the power consumption will be.

An existing smart phone system is a multitask system in which many applications run simultaneously, and data of a plurality of applications may be exchanged with the network concurrently. For example, a browser is used for surfing the internet in the foreground while QQ and WeChat are enabled to run in the background. The browser, QQ and WeChat will initiate their respective data transmission independently according to their own demands during any period of time. The total number of data transmission times in the mobile phone system is the sum of data transmission times of the browser, QQ and Wechat during this period of time (provided that the browser initiates data transmission for 3 times, QQ and WeChat initiate data transmission twice respectively, then the total number of data transmission times in the mobile phone system is 3+2+2=7 times). An ideal method is to centralize (combine) the 7 times of data transmission into one transmission, which can reduce the data transmission times in the mobile phone system, and reduce power consumption to the largest extent. However, this ideal method has two problems as follows:

1) some data transmission operations can be hardly centralized, such as page browsing; a data transmission operation has to be initiated each time when a user clicks a hyperlink, so as to obtain a new webpage to continue browsing; if this data transmission is postponed and combined with data transmission operations of other applications, it is apparent that demands of the user can be hardly met;

2) even if a data transmission operation can be postponed, it is still difficult to combine data transmission, it is necessary to know information indicating the time when other applications in the system will conduct data transmission, while the information can be hardly obtained.

SUMMARY

The technical problem to be solved by embodiments of the present disclosure is to provide a method and device for controlling concurrent data transmission and a terminal so as to solve the problems of many data transmission times and high power consumption in a terminal system.

An embodiment of the present disclosure provides a method for controlling concurrent data transmission so as to solve the technical problems above. The method is applied to a terminal and includes that:

a data transmission request sent by a terminal system is received;

when it is judged that the received data transmission request is an important data transmission request, the data transmission is permitted; and when it is judged that the received data transmission request is an unimportant data transmission request, whether the unimportant data transmission request is permitted is judged, and when the unimportant data transmission request is permitted, the unimportant data transmission is conducted; otherwise, the unimportant data transmission is prohibited.

In an example embodiment, judging whether the unimportant data transmission request is permitted may include that:

whether the terminal system is in a time period of data transmission is judged, and when the terminal system is in the time period of data transmission, the unimportant data transmission request is permitted.

In an example embodiment, the time period of data transmission may be a time period in which transmission of important data or approved unimportant data is permitted.

In the method for controlling concurrent data transmission, when the terminal system is not in the time period of data transmission, judging whether the unimportant data transmission request is permitted may further include that:

after the terminal system completes a preset data transmission operation, the unimportant data transmission request is permitted in a continuous time period T1 which is an unimportant data transmission permitted period;

the unimportant data transmission request is prohibited in a time period T2, which is an unimportant data transmission request prohibited period, after T1;

permitting the unimportant data transmission request in a time period T3, which is an unimportant data transmission permitted period, after T2;

the number of times, E, that the time period T2 has passed is statistically counted;

when there is no unimportant data transmission request in the time period T3, the time period T2 in which the unimportant data transmission request is prohibited is started after the time period T3;

the time period T3 in which the unimportant data transmission request is permitted is started after the time period T2;

in a case that there is no unimportant data to be transmitted, the terminal system executes the previous three steps in turn, wherein a current time length of the time period T2=a time length of a last time period T2*E, and a time length of the time period T2 remains unchanged after the time length of the time period T2 increases to a preset time length according to the formula;

in a case that, in the above process, the system generates an unimportant data transmission request in the time period in which the unimportant data transmission request is permitted, the system re-enters the time period T1 in which the unimportant data transmission request is permitted, and resets the number of times, E, that the T2 time period has passed.

An embodiment of the present disclosure further provides a device for controlling concurrent data transmission, including:

a receiving component, configured to receive a data transmission request sent by a terminal system;

a first judging component, configured to judge a type of the data transmission request to obtain a first judging result;

a first control component, configured to control to conduct the data transmission when the first judging result indicates that the type of the data transmission request is an important data transmission request;

a second judging component configured to, when the first judging result indicates that the type of the data transmission request is an unimportant data transmission request, judge whether the unimportant data transmission request is permitted to obtain a second judging result; and a second control component configured to, when the second judging result indicates that the unimportant data transmission request is permitted, control to conduct the unimportant data transmission, and otherwise, prohibit the unimportant data transmission.

In an example embodiment, when the data transmission is the unimportant data transmission request, the device for controlling concurrent data transmission may further include:

a third judging component, configured to judge whether the terminal system is in a time period of data transmission to obtain a third judging result; and a third control component, configured to permit the unimportant data transmission request when the third judging result indicates that the terminal system is in the time period of data transmission.

In an example embodiment, the time period of data transmission may be a time period in which transmission of important data or approved unimportant data is permitted.

In the device for controlling concurrent data, when the third judging result indicates that the terminal system is not in the time period of data transmission, the device for controlling concurrent data transmission may further include:

a first timer, configured to count down from a time period T1 in which the unimportant data transmission request is permitted;

a second timer, configured to count down from a time period T2 in which the unimportant data transmission request is prohibited;

a counter, configured to statistically count the number of times, E, that the time period T2, in which the unimportant data transmission request is prohibited, has passed;

a third timer, configured to count down from a time period T3 in which the unimportant data transmission request is permitted;

wherein when there is no unimportant data transmission request, the second timer starts counting down after expiration of the first timer; the unimportant data transmission request is prohibited during a working process of the second timer; the third timer starts counting down after expiration of the second timer; the second timer starts counting down after expiration of the third timer when there is no unimportant data transmission request during a working process of the third timer, and a current time length of the time period T2=a time length of the last time period T2*E, and a time length of the time period T2 remains unchanged after the time length of the time period T2 increases to a preset time length according to the formula.

An embodiment of the present disclosure further provides a terminal, including the device for controlling concurrent data transmission.

The technical solutions of the embodiments of the present disclosure have the following beneficial effects.

In the solution above, data transmission requests in a terminal system are divided into important data transmission requests and unimportant data transmission requests. When a data transmission request is received, the terminal system judges the type of the data transmission request, and limits the transmission times of some unimportant data, thus reducing the power consumption generated during a data transmission process of the terminal system as much as possible.

DETAILED DESCRIPTION OF THE EMBODIMENTS

Detailed description will be provided hereinafter with reference to the accompanying drawings and specific embodiments so that the technical problems to be solved by the present disclosure, the technical solutions and advantages of the present disclosure are clearer.

The embodiments of the present disclosure provide a method and device for controlling concurrent data transmission, and a terminal so as to solve the problems of many data transmission times and high power consumption in an existing terminal system.

An embodiment of the present disclosure provides a method for controlling concurrent data transmission, applied to a terminal, and including that:

a data transmission request sent by a terminal system is received;

when it is judged that the received data transmission request is an important data transmission request, the data transmission is permitted; and when it is judged that the received data transmission request is an unimportant data transmission request, whether the unimportant data transmission request is permitted is judged, and when the unimportant data transmission request is permitted, the unimportant data transmission is conducted; otherwise, the unimportant data transmission is prohibited.

It needs to be noted that, during specific implementation, the importance of data transmission may be defined by applying an impact on the promptness of user interaction. In other words, data transmission that largely impacts the promptness of the user interaction is defined as important data transmission, while others are defined as unimportant data transmission. For example, since the user interaction is mainly impacted by applications of the foreground, all data transmission requests generated by the applications of the foreground are important data transmission, while all data transmission requests generated by applications of the background are unimportant data transmission in the embodiment of the present disclosure.

In the embodiment of the present disclosure, the type of the data transmission request is judged. If the data transmission request is an important data transmission request, the data transmission is permitted. If it is judged that the data transmission request is an unimportant data transmission request, whether the unimportant data transmission request is permitted is further judged, and when the unimportant data transmission is permitted, the unimportant data transmission is conducted; otherwise, the unimportant data transmission is prohibited. Some unimportant data transmission requests are limited, thus reducing the times of unimportant data transmission, and lowering the power consumption generated by the terminal system during a data transmission process.

In another embodiment of the present disclosure, when it is judged that the data transmission request is an unimportant data transmission request, judging whether the unimportant data transmission request is permitted includes that:

whether the terminal system is in a time period of data transmission is judged, and when the terminal system is in the time period of data transmission, the unimportant data transmission request is permitted.

In an example embodiment, the time period of data transmission may be a time period in which transmission of important data or approved unimportant data is permitted.

In the embodiment of the present disclosure, whether the terminal system is in the time period of data transmission (the time period in which the important data or the approved unimportant data is transmitted) is judged, and if the unimportant data transmission request is in the time period of data transmission of the terminal system, the unimportant data transmission request of the terminal system is permitted.

In still another embodiment of the present disclosure, when the unimportant data transmission request is not in the time period of data transmission of the terminal system, specific steps for judging whether the unimportant data transmission request is permitted further include that:

after the terminal system completes a preset data transmission operation, the unimportant data transmission request is permitted in a continuous time period T1 which is an unimportant data transmission permitted period;

the unimportant data transmission request is prohibited in a time period T2, which is an unimportant data transmission request prohibited period, after T1;

permitting the unimportant data transmission request in a time period T3, which is an unimportant data transmission permitted period, after T2;

the number of times, E, that the time period T2 has passed is statistically counted;

when there is no unimportant data transmission request in the time period T3, the time period T2 in which the unimportant data transmission request is prohibited is started after the time period T3;

the time period T3 in which the unimportant data transmission request is permitted is started after the time period T2;

in a case that there is no unimportant data to be transmitted, the terminal system executes the previous three steps in turn, wherein a current time length of the time period T2=a time length of a last time period T2*E, and a time length of the time period T2 remains unchanged after the time length of the time period T2 increases to a preset time length according to the formula;

in a case that, in the above process, the system generates an unimportant data transmission request in the time period in which the unimportant data transmission request is permitted, the system re-enters the time period T1 in which the unimportant data transmission request is permitted, and resets the number of times, E, that the T2 time period has passed.

It needs to be noted that the embodiment above is an implementation method for determining a time window of unimportant data transmission.

The method for determining a time window of unimportant data transmission will be expounded below.

Figure 1:
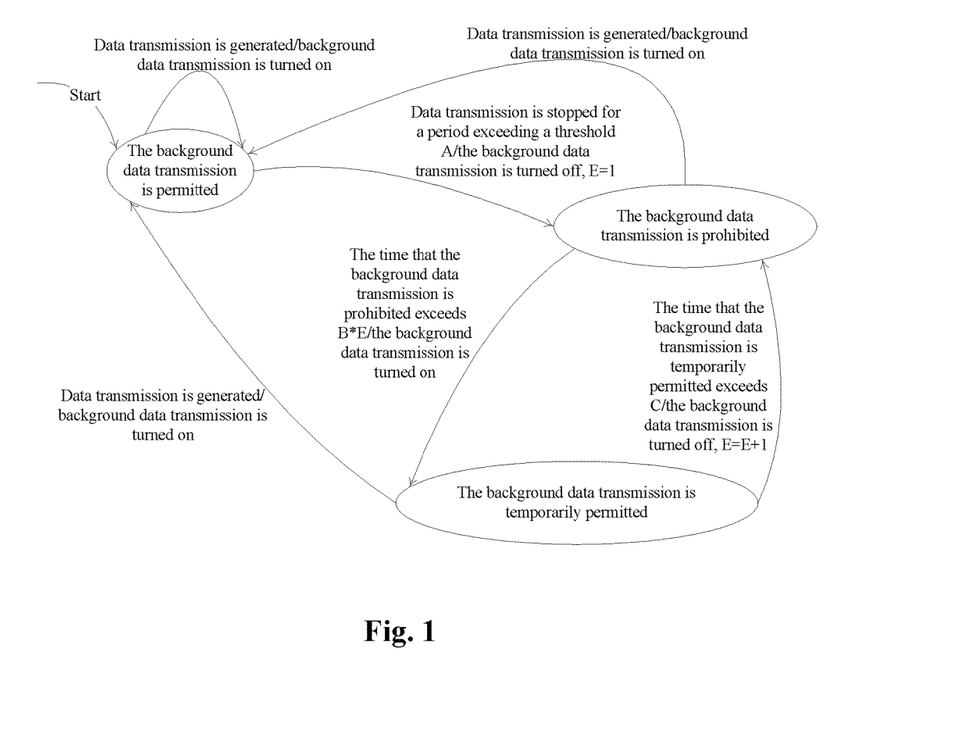
FIG. 1 is a flowchart of determining an unimportant data transmission window according to an embodiment of the present disclosure.

As shown in FIG. 1, the method includes the following steps.

Step 11: A terminal system is waited to complete a data transmission operation.

Step 12: A continuous time period T1 is a time window in which unimportant data transmission is permitted. If no data transmission request is generated within the continuous time period, the terminal system executes data transmission and Step 11 is performed.

Step 13: A time period T2 is a time window in which unimportant data transmission is prohibited.

Step 14: A time period T3 is a time window in which unimportant data transmission is permitted. If no data transmission request is generated within the continuous time period, the terminal system executes data transmission and Step 11 is performed.

Step 15: The number of times, E, that the time period T2 has passed is statistically counted. A duration of the time period T2 is: a current time length of the time period T2=a time length of the last time period T2*E. The continuous time period T2 is the time window in which unimportant data transmission is prohibited. If a time length of the time period T2 exceeds a preset maximum time limit Tmax, a time length of T2=Tmax, and Step 12 is performed.

Step 16: The continuous time period T3 is the time window in which unimportant data transmission is permitted. If a data transmission request is generated within the continuous time period, the terminal system executes data transmission and Step 11 is performed. If no data transmission request is generated, Step 15 is performed.

In the embodiment of the present disclosure, according to an exponential back-off method, a time period in which an unimportant data transmission request is prohibited is prolonged gradually in the case that there has been no data transmission request, and after the time period in which an unimportant data transmission request is prohibited reaches a preset duration, the time period in which an unimportant data transmission request is prohibited will remain unchanged so as to reduce an impact on user experience, and a time window of an unimportant data transmission request will be opened again when an unimportant data transmission request is generated during a phase in which unimportant data transmission is permitted. Unimportant data transmission is limited by such a method so that the times of unimportant data transmission can be limited (reduced) while an impact caused by limiting unimportant data on the promptness of user interaction can be also reduced.

It needs to be noted that the time lengths of T1 and T3 in the embodiment of the present disclosure are equal durations which may always remain unchanged and may be also preset as changeable durations according to practical requirements. It needs to be noted that, those skilled in the art should be able to understand a method for determining a time window of an unimportant data transmission request according to the exponential back-off method, and repeated description will not be provided here.

Figure 2:
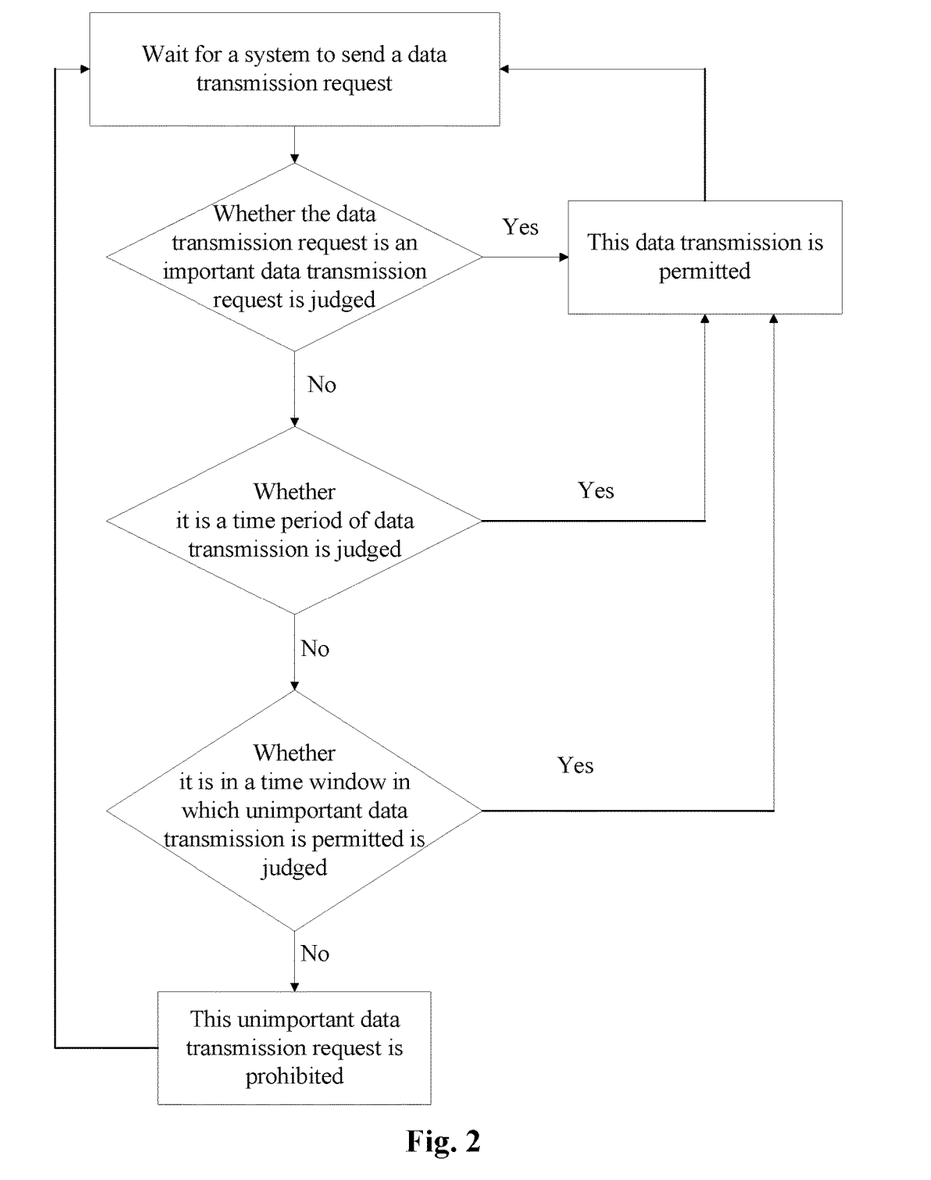
FIG. 2 is an overall flowchart of a method for controlling concurrent data transmission according to an embodiment of the present disclosure.

As shown in FIG. 2, a specific flow of a method of the present disclosure includes that: a terminal system is waited to send a data transmission request; whether the data transmission request is an important data transmission request is judged; when the data transmission request is an important data transmission request, the data transmission is permitted; otherwise (the data transmission request is an unimportant data transmission request), whether the terminal system is in a time period of data transmission is further judged (i.e. a time period in which important data or approved unimportant data is transmitted); when the terminal system is in the time period of data transmission, the unimportant data transmission is permitted; otherwise, whether the terminal system is in a time window in which unimportant data transmission is permitted is further judged; if the terminal system is in a time window in which unimportant data transmission is permitted, the unimportant data transmission is permitted; otherwise, the unimportant data transmission is prohibited.

In the embodiment of the present disclosure, a data transmission request of a terminal system is judged; an important data transmission request is permitted; an unimportant data transmission request is further judged; an unimportant transmission request in a data transmission phase of the terminal system is permitted; an unimportant transmission request not in the data transmission phase of the terminal system is prohibited; whether the terminal system is in a time window of unimportant data transmission is further judged; if the terminal system is in a time window of unimportant data transmission, the unimportant data transmission is permitted; and if the terminal system is in a time window in which unimportant data transmission is prohibited, the unimportant data transmission is prohibited. The times of unimportant data transmission are limited, thus reducing the power consumption generated by the terminal system during an unimportant data transmission process.

An embodiment of the present disclosure further provides a device for controlling concurrent data transmission, including:

a receiving component, configured to receive a data transmission request sent by a terminal system;

a first judging component, configured to judge a type of the data transmission request to obtain a first judging result;

a first control component, configured to control to conduct the data transmission when the first judging result indicates that the type of the data transmission request is an important data transmission request;

a second judging component configured to, when the first judging result indicates that the type of the data transmission request is an unimportant data transmission request, judge whether the unimportant data transmission request is permitted to obtain a second judging result; and a second control component configured to, when the second judging result indicates that the unimportant data transmission request is permitted, control to conduct the unimportant data transmission, and otherwise, prohibit the unimportant data transmission.

In another embodiment of the present disclosure, when the data transmission is the unimportant data transmission request, the device for controlling concurrent data transmission may further include:

a third judging component, configured to judge whether the terminal system is in a time period of data transmission to obtain a third judging result; and a third control component, configured to permit the unimportant data transmission request when the third judging result indicates that the terminal system is in the time period of data transmission.

It needs to be noted that, the time period of data transmission may be a time period in which transmission of important data or approved unimportant data is permitted.

In still another embodiment of the present disclosure, when the third judging result indicates that the terminal system is not in the time period of data transmission, the device for controlling concurrent data transmission may further include:

a first timer, configured to count down from a time period T1 in which the unimportant data transmission request is permitted;

a second timer, configured to count down from a time period T2 in which the unimportant data transmission request is prohibited;

a counter, configured to statistically count the number of times, E, that the time period T2, in which the unimportant data transmission request is prohibited, has passed;

a third timer, configured to count down from a time period T3 in which the unimportant data transmission request is permitted;

when there is no unimportant data transmission request, the second timer starts counting down after expiration of the first timer; the unimportant data transmission request is prohibited during a working process of the second timer; the third timer starts counting down after expiration of the second timer; the second timer starts counting down after expiration of the third timer when there is no unimportant data transmission request during a working process of the third timer, and a new time length of the second timer is: a current time length of the time period T2=a time length of the last time period T2*E, and a time length of the time period T2 remains unchanged after the time length of the time period T2 increases to a preset time length according to the formula.

It needs to be noted that when the time length of the second timer reaches a preset duration, the time period T2 will be timed according to a preset value in the case that there is no unimportant data transmission request. During a process that the second timer and the third timer work alternately, when the system generates a data transmission request (an important data transmission request or an unimportant data transmission request) during a working process of the third timer, the counter will reset statistics of the times of the time period T2, and when the data transmission request is an unimportant data transmission request, the system enters a working period of the first timer in which unimportant data transmission is permitted to permit the data transmission.

It needs to be noted that the device embodiment is a device corresponding to the method above, and all implementation methods of the method above are applicable in the device embodiment, and are also able to implement the same technical effect as that in the method above.

An embodiment of the present disclosure further provides a terminal including the device for controlling concurrent data transmission.

Application of the embodiment above is described as follows:

Taking an Android mobile phone as an example, unimportant data therein is background data defined by Android, and transmission of the background data is prohibited or permitted by such as system Application Program Interface (API) as NetworkPolicyManager.setRestrictBackground( ) (a network policy management and restriction background data function) provided by Android. A TelephonyManager (information management) class provided by the Android platform waits for a system to complete a data transmission operation and waits for the system to send a data transmission request, and a timer provided by the Android platform completes an operation within a continuous period of time.

Step a: NetworkPolicyManager.setRestrictBackground (true) is invoked to prohibit the transmission of the background data.

Step b: The TelephonyManager class of the Android platform is waited to report a data transmission state change event or a timer timing period expiration event.

Step c: If an event is reported by the TelephonyManager class, and the reported event is activity data input (i.e. DATA_ACTIVITY_IN) or activity data output (i.e. DATA_ACTIVITY_OUT) or activity data input and output (i.e. DATA_ACTIVITY_INOUT), it is indicated that it is an important data (foreground data) transmission request or the system is in a phase of data transmission (an unimportant data transmission request is generated within a time period of an unimportant data transmission window), NetworkPolicyManager.setRestrictBackground(false) is invoked to permit execution of the background data transmission request, and all timers are cancelled.

Step d: If an event is reported by the TelephonyManager class, and the reported event is that there is no activity data (i.e. DATA_ACTIVITY_NONE), or activity data is in a dormant state (i.e. DATA_ACTIVITY_DORMANT), it is indicated that the system completes a transmission operation, a timer Timer1 having a duration T1 is started, and the duration T1 is used as a time window in which unimportant data transmission is permitted, and Step b is performed.

Step e: If there is a timer timing period expiration event, and the timing period of Timer1 expires, NetworkPolicyManager.setRestrictBackground(true) is invoked to prohibit the transmission of the background data. It is indicated that no data transmission request is generated in the time period T1. A timer Timer2 having a timing period T2 is started. In other words, the time period T2 is a time window in which unimportant data transmission is prohibited, and Step b is performed.

Step f: If there is a timer timing period expiration event, and the timing period of Timer2 expires, NetworkPolicyManager.setRestrictBackground(false) is invoked to permit the transmission of the background data. At the moment, it is indicated that a duration in which the transmission of the background data is prohibited has reached the duration T2. A timer Timer3 with timing period T3 is started. In other words, such the period T3 is a time window in which unimportant data transmission is permitted. In the meanwhile, a counter is started to record the times that the time period T2 passes, and record the same as E, and step b is performed.

Step g: If there is a timer timing period expiration event, and the timing period of Timer3 expires, NetworkPolicyManager.setRestrictBackground(true) is invoked to permit the transmission of the background data. At the moment, it is indicated that a period in which the transmission of the background data is prohibited has reached the duration T3. A timer Timer4 (wherein Tmax is the maximum timing period of the time period T2 preset by Timer4) with a timing period of T2=T2=min(T2*E, Tmax) is started. In other words, the time period T2 is a time window in which unimportant data transmission is prohibited, and Step b is performed.

The above is a detailed application process of the present disclosure in a mobile phone terminal.

In the embodiments of the present disclosure, a terminal equipped with a device for controlling concurrent data transmission reduces the transmission times of background data, reduces the power consumption generated during a data transmission process, and satisfies a user requirement of reducing power consumption of a terminal during application.

What are described above are preferred embodiments of the present disclosure. It should be pointed out that several improvements and modifications may be also made without departing from the principles of the present disclosure for those skilled in the art, and these improvements and modifications should be regarded as the protection scope of the present disclosure.

INDUSTRIAL APPLICABILITY

The technical solution provided by the present disclosure may be applied in a concurrent data transmission control process. Data transmission requests in a terminal system are divided into important data transmission requests and unimportant data transmission requests. When a data transmission request is received, the terminal system judges the type of the data transmission request, and limits transmission times of some unimportant data, thus reducing, to the largest extent, the power consumption generated by the terminal system during a data transmission process.

What is claimed is:

1. A method for controlling concurrent data transmission, applied to a terminal and comprising:
 receiving a data transmission request sent by a terminal system;
 when it is judged that the received data transmission request is an important data transmission request, permitting the data transmission; and
 when it is judged that the received data transmission request is an unimportant data transmission request, judging whether the unimportant data transmission request is permitted, and when the unimportant data transmission request is permitted, conducting the unimportant data transmission; otherwise, prohibiting the unimportant data transmission;
 wherein judging whether the unimportant data transmission request is permitted comprises: judging whether the terminal system is in a time period of data transmission, and when the terminal system is in the time period of data transmission, permitting the unimportant data transmission request;

wherein when the terminal system is not in the time period of data transmission, judging whether the unimportant data transmission request is permitted further comprises:

step a: after the terminal system completes a preset data transmission operation, permitting the unimportant data transmission request in a continuous time period T1 which is an unimportant data transmission permitted period;

step b: prohibiting the unimportant data transmission request in a time period T2, which is an unimportant data transmission request prohibited period, after T1;

step c: permitting the unimportant data transmission request in a time period T3, which is an unimportant data transmission permitted period, after T2;

wherein statistically counting the number of times, E, that the time period T2 has passed; when there is no unimportant data transmission request in the time period T3, starting, after the time period T3, the time period T2 in which the unimportant data transmission request is prohibited; starting, after the time period T2, the time period T3 in which the unimportant data transmission request is permitted; in a case that there is no unimportant data to be transmitted, executing, by the terminal system, the previous steps a-c in turn, wherein a current time length of the time period T2=a time length of a last time period T2*E, and a time length of the time period T2 remains unchanged after the time length of the time period T2 increases to a preset time length according to the formula; in a case that, in the above process, the system generates an unimportant data transmission request in the time period in which the unimportant data transmission request is permitted, re-entering the time period T1 in which the unimportant data transmission request is permitted, and resetting the number of times, E, that the T2 time period has passed, by the system.

2. The method for controlling concurrent data transmission as claimed in claim 1, wherein the time period of data transmission is a time period in which transmission of important data or approved unimportant data is permitted.

3. A device for controlling concurrent data transmission, comprising:

a receiving component, configured to receive a data transmission request sent by a terminal system;

a first judging component, configured to judge a type of the data transmission request to obtain a first judging result;

a first control component, configured to control to conduct the data transmission when the first judging result indicates that the type of the data transmission request is an important data transmission request;

a second judging component configured to, when the first judging result indicates that the type of the data transmission request is an unimportant data transmission request, judge whether the unimportant data transmission request is permitted to obtain a second judging result; and a second control component configured to, when the second judging result indicates that the unimportant data transmission request is permitted, control to conduct the unimportant data transmission, and otherwise, prohibit the unimportant data transmission;

wherein when the data transmission is the unimportant data transmission request, the device for controlling concurrent data transmission further comprises: a third judging component, configured to judge whether the terminal system is in a time period of data transmission to obtain a third judging result and a third control component, configured to permit the unimportant data transmission request when the third judging result indicates that the terminal system is in the time period of data transmission;

wherein when the third judging result indicates that the terminal system is not in the time period of data transmission, the device for controlling concurrent data transmission further comprises: a first timer, configured to count down from a time period T1 in which the unimportant data transmission request is permitted; a second timer, configured to count down from a time period T2 in which the unimportant data transmission request is prohibited; a counter, configured to statistically count the number of times, E, that the time period T2, in which the unimportant data transmission request is prohibited, has passed; a third timer, configured to count down from a time period T3 in which the unimportant data transmission request is permitted; wherein when there is no unimportant data transmission request, the second timer starts counting down after expiration of the first timer; the unimportant data transmission request is prohibited during a working process of the second timer; the third timer starts counting down after expiration of the second timer; the second timer starts counting down after expiration of the third timer when there is no unimportant data transmission request during a working process of the third timer, and a current time length of the time period T2=a time length of the last time period T2*E, and a time length of the time period T2 remains unchanged after the time length of the time period T2 increases to a preset time length according to the formula.

4. The device for controlling concurrent data transmission as claimed in claim 3, wherein the time period of data transmission is a time period in which transmission of important data or approved unimportant data is permitted.

5. A terminal, comprising a device for controlling concurrent data transmission, wherein the device comprises:

a receiving component, configured to receive a data transmission request sent by a terminal system;

a first judging component, configured to judge a type of the data transmission request to obtain a first judging result;

a first control component, configured to control to conduct the data transmission when the first judging result indicates that the type of the data transmission request is an important data transmission request;

a second judging component configured to, when the first judging result indicates that the type of the data transmission request is an unimportant data transmission request, judge whether the unimportant data transmission request is permitted to obtain a second judging result; and a second control component configured to, when the second judging result indicates that the unimportant data transmission request is permitted, control to conduct the unimportant data transmission, and otherwise, prohibit the unimportant data transmission;

wherein when the data transmission is the unimportant data transmission request, the device for controlling concurrent data transmission further comprises: a third judging component, configured to judge whether the terminal system is in a time period of data transmission to obtain a third judging result; and a third control component, configured to permit the unimportant data transmission request when the third judging result indicates that the terminal system is in the time period of data transmission;

wherein when the third judging result indicates that the terminal system is not in the time period of data transmission, the device for controlling concurrent data transmission further comprises: a first timer, configured to count down from a time period T1 in which the unimportant data transmission request is permitted; a second timer, configured to count down from a time period T2 in which the unimportant data transmission request is prohibited; a counter, configured to statistically count the number of times, E, that the time period T2, in which the unimportant data transmission request is prohibited, has passed; a third timer, configured to count down from a time period T3 in which the unimportant data transmission request is permitted; wherein when there is no unimportant data transmission request, the second timer starts counting down after expiration of the first timer; the unimportant data transmission request is prohibited during a working process of the second timer; the third timer starts counting down after expiration of the second timer; the second timer starts counting down after expiration of the third timer when there is no unimportant data transmission request during a working process of the third timer, and a current time length of the time period T2=a time length of the last time period T2*E, and a time length of the time period T2 remains unchanged after the time length of the time period T2 increases to a preset time length according to the formula.

6. The terminal as claimed in claim 5, wherein the time period of data transmission is a time period in which transmission of important data or approved unimportant data is permitted.

* * * * *